United States Patent [19]
Haslund

[11] 3,995,189
[45] Nov. 30, 1976

[54] LOW-DISTURBANCE TRANSPARENT ELECTRODE FOR SUPERSONIC FLOW CHANNEL

[75] Inventor: Ralph Leslie Haslund, Mercer Island, Wash.

[73] Assignee: The Boeing Company, Seattle, Wash.

[22] Filed: Oct. 17, 1974

[21] Appl. No.: 515,624

[52] U.S. Cl. .............................. 313/351; 313/309;
331/94.5 PE; 331/94.5 G; 315/111.1
[51] Int. Cl.$^2$ ........................................ H01J 1/02
[58] Field of Search ............... 331/94.5 PE, 94.5 G,
331/351, 94.5; 313/306, 309, 351; 315/249,
111, 111.1, 111.6

[56] References Cited
UNITED STATES PATENTS

| | | | |
|---|---|---|---|
| 3,543,179 | 11/1970 | Wilson | 331/94.5 G |
| 3,636,472 | 1/1972 | Leonard et al. | 313/351 |
| 3,795,874 | 3/1974 | Li Pan et al. | 331/94.5 PE |
| 3,842,365 | 10/1974 | Hundstad et al. | 331/94.5 PE |
| 3,842,366 | 10/1974 | Gordon | 331/94.5 PE |
| 3,876,958 | 4/1975 | Parker | 331/94.5 PE |
| 3,906,392 | 9/1975 | Mann | 331/94.5 PE |
| 3,906,398 | 9/1975 | Low et al. | 331/94.5 PE |

OTHER PUBLICATIONS

"Low Voltage Gas Transport TECO$_2$ Laser" by Sedgwick et al., Apr. 1972/vol. 11, No. 4/Applied Optics, pp. 745–748.
"Supersonic Transverse Electrical Discharge Laser" by Brandenberg et al., Apr. 1972/vol. QE–No. 4, IEEE Journal of Quantum Electronics, pp. 414–418.

*Primary Examiner*—Saxfield Chatmon, Jr.
*Attorney, Agent, or Firm*—Christensen, O'Connor, Garrison & Havelka

[57] ABSTRACT

An electrode for a supersonic flow channel comprising a series of spaced bars that define spaced closed grooves with depths equal to the bar depth located transverse to the flow direction is disclosed. The length (in the direction of flow) to depth ratio of the grooves is such that the flow creates substantially stationary vortices in the grooves. The bottoms of the grooves between the bars are defined by a thin foil that forms a suitable window for an ionizing beam. A replical backing grid also formed of spaced bars is used to sandwich the foil to prevent undesired movement thereof without reducing transparency.

11 Claims, 7 Drawing Figures

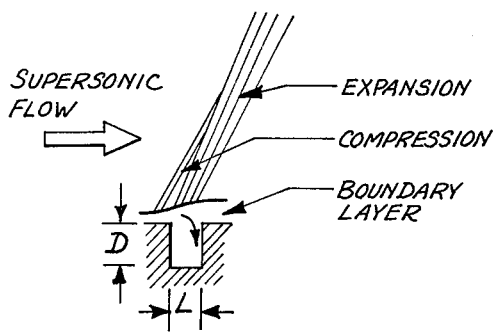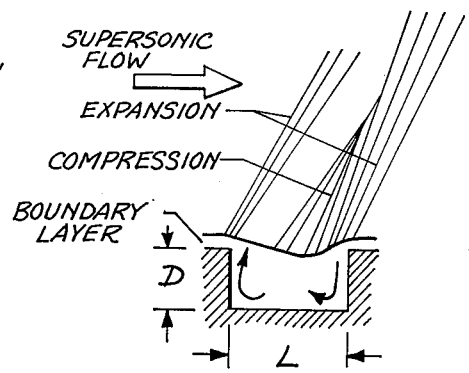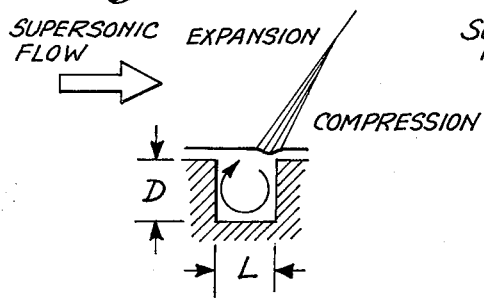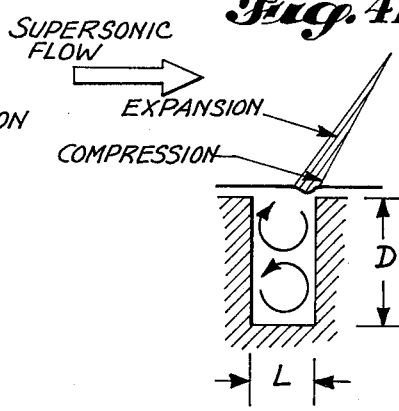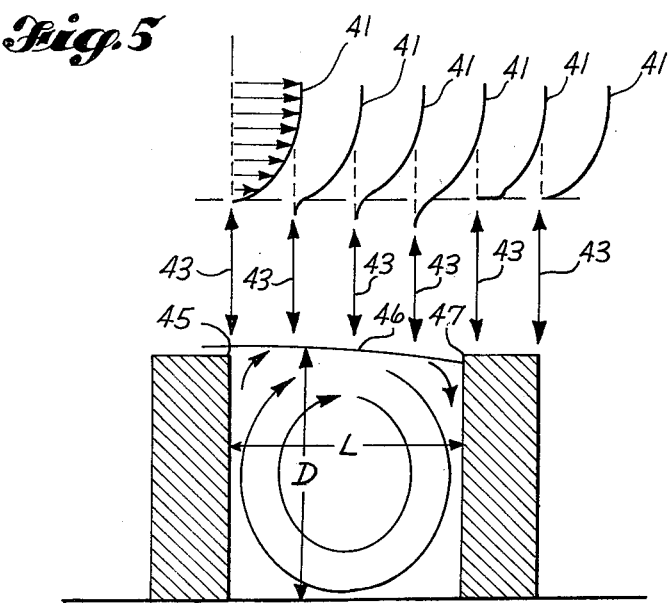

LOW-DISTURBANCE TRANSPARENT ELECTRODE FOR SUPERSONIC FLOW CHANNEL

BACKGROUND OF THE INVENTION

This invention is directed to supersonic flow channels and, more particularly, to electrodes suitable for use in supersonic flow channels. As will be better understood from the following description, this invention is primarily useful as an electrode for a high power, ionizing beam supported, uniform electrical discharge through a supersonic flow.

Supersonic electrical discharge lasers include a supersonic flow channel through which a suitable gas travels at supersonic speeds. Electrodes, formed in the walls of the channel, create high power, ionizing beam supported, uniform electrical discharges through the flow at predetermined intervals. In order for such a laser to operate satisfactorily, the electrode configuration must satisfy four requirements. First, it must not unduly disturb the supersonic flow; second, it must provide a "window" for the ionizing beam; third, it must have a cross-sectional area adequate to conduct large electric currents; and, fourth, it must be strong enough to withstand up to an atmosphere of wall pressure without distortion.

With respect to the first requirement noted above, it has been found that local flow deflection angles cannot exceed about 0.1° because of the magnitude of the density variation through associated waves. Greater angles with stronger waves result in too large an optical path distortion. While a solid flat plate electrode can be readily designed to meet this restriction, a solid flat plate electrode will not satisfy the other denoted requirements, particularily the second requirement. In the absence of a solid wall, pressure becomes the boundary condition that controls flow direction.

Therefore, it is an object of this invention to provide an electrode for a supersonic flow channel that provides a pressure boundary that does not unduly disturb a supersonic gas flow through the channel.

It is a more general object of this invention to provide a solid non-flat plate supersonic flow channel wall that does not unduly disturb a supersonic gas flow through the channel.

In the past, the second and third requirements noted above have been solved by forming the electrode of a uniform array of metal bars or wires located parallel to the flow direction. The bars were thick enough to safely conduct the current and withstand the pressures involved. further, the bars were separated by open spaces. The spaces provide a window for an electron, ultra-violet ray, or X-ray beam, and normally make up at least 70% of the area covered by the entire electrode. In theory, if the static pressure between the bars immediately adjacent to the supersonic stream is matched to the static pressure of the flow to within about 0.75%, the associated flow disturbance will be adequately small. In practice, however, it is difficult to maintain this level of pressure matching because of the high velocity shear layer that exists where the two static pressures meet. More specifically, there is a dynamic interaction through the high velocity shear layer that causes it to entrain the adjacent gas between the bars and pump it out with the flow. The only known way to overcome this problem is to continually resupply gas to the grooves between the bars so as to maintain the desired pressure in these regions. However, resupplying gas to this region presents other problems. Specifically, the degree of pumping of the gas from the grooves varies in the streamwise direction so that different local resupply rates are required for a local pressure match. Thus, there are two main, but related, problems associated with prior art electrodes comprising a series of spaced bars arrayed parallel to the supersonic flow direction. First, the gas between the bars is pumped out with the flow whereby the gas must be continuously resupplied in order to maintain the necessary pressure match. Second, the rate of pumping varies in the direction of flow whereby the gas must be resupplied at different rates along the grooves between the bars.

Attempts to achieve the desired pressure matching have been made; however, they have not been as successful as desired. The forced injection of gas into the grooves has been found to be entirely unsuitable because only about 20% pressure equalization can be achieved. While demand flow through a large opening into a large constant pressure reservoir can provide adequate pressure matching, this technique is also undesirable. Specifically, pressure matching, within a few percent can only be provided for a small fraction of a second using this technique. Moreover, in order to obtain any suitable pressure match at all, the pressure behind the bars (in the pressure reservoir) must be initially higher than the flow static pressure. Then, the discharge must be timed to occur exactly when the shear layer pumping action has created the closest possible pressure match. Moreover, the small streamwise pressure gradient created by the pumping action must be accepted as a limiting factor. Finally, while this technique for pressure matching may be useful when the discharge pulse period is short, obviously, it cannot be used when the discharge pulse period is long. Morever, the recovery period makes this technique unsuitable when rapid repetitive pulsing is desired. In addition, this technique does not result in high flow uniformity.

Another attempt directed to overcoming the foregoing problems was to place a thin foil over the bars, adjacent to the flow, to seal the surface and appear to the flow as a smooth solid wall. It has also been unsuccessful. Nonmetallic foils, sufficiently thin to act as a window, rupture under the starting pressure wave generated by the supersonic flow. In addition, because nonmetallic foils are generally electrically nonconducting, high power discharging is not possible. Also, thin metallic foils provide additional electrode surface for the high power discharge in the areas of greatest ionizing beam intensity. Adequately thin metal foils rupture during such a discharge. Moreover, because of the wide electrode bar spacing required to obtain the desired large window area, thin metal foils dimple and create surface angles much greater than the 0.1° limiting value discussed above. Thus, the intended ideal flow boundary is not realized utilizing a thin foil to form part of the electrode structure where the electrode bars run parallel to the direction of flow and the foil, whether it be metallic or nonmetallic, lies atop the bars.

It has also been found that placing a thin foil behind electrode bars aligned parallel to the direction of flow does not eliminate the production of distorting waves. In this case, shear layer pumping deflects the flow into the shallow regions (grooves) formed between the bars causing it to attach to the foil. The deflected flow results in the production of moderately strong waves in the main flow. A gradual taper upstream of the bars to control the deflection angle and, therefore, the strength of the associated waves is impracticable because the taper would have to start many feet upstream of the electrode in order not to exceed the 0.1° deflection angle limitation discussed above. It is also impracticable to extend the electrode bars upstream into the nozzle.

It can be seen from the foregoing discussion of different types of electrodes generally formed of a plurality of parallel bars aligned with the direction of flow, that such electrodes create a number of problems which made their use generally undesirable.

Therefore, it is also an object of this invention to provide a new and improved electrode suitable for use in an electrical discharge laser.

It is a further object of this invention to provide a low-disturbance grid wall suitable for use as an electrode in a supersonic electrical discharge laser that does not require the inclusion of complicated mechanisms to create pressure matching at the shear layer.

It is yet another object of this invention to provide a low-disturbance electrode suitable for use in a supersonic electrical discharge laser that allows high power and/or rapid electrical discharges to occur in the gas passing through the laser's channel.

SUMMARY OF THE INVENTION

In accordance with principles of this invention, a low-disturbance transparent electrode for a supersonic flow channel is provided. The electrode can be used for a gas discharge laser. The electrode of the invention comprises at least one groove located orthogonal to the flow direction defined by the supersonic flow channel. The groove aspect ratio, i.e., the length (in the direction of flow) to depth ratio of the groove, is such that one or more substantially stationary "open" vortices are formed in the groove. Though the vortices involve continuous flow circulation, they are open in the sense that mass is continually lost at the upstream region of the groove and added at the downstream end.

In accordance with other principles of this invention, the electrode comprises a plurality of parallel rectangular grooves located orthogonal to the flow direction defined by the channel. The grooves are defined by a plurality of parallel bars that are generally rectangular in cross section. Further, the reciprocals of the length to depth (aspect) ratios of the closed grooves are preferably substantially integral (i.e., 1, 2, etc.) whereby an integral number of vorticies are formed in each groove.

In accordance with further principles of this invention, the base of the grooves is defined by a thin foil adapted to form an ionizing beam window or output foil. Further, a replica backing grid, also formed of a plurality of bars, is used to sandwich the foil to prevent undesired movement thereof.

It will be appreciated from the foregoing brief summary that the invention provides a low-disturbance transparent electrode for supersonic flow channels. The invention is suitable for use as an electrode in a supersonic electrical discharge laser. Alternatively, it is suitable for use as an electrode for uniformly adding energy to (heating) a supersonic flow.

BRIEF DESCRIPTION OF THE DRAWINGS

The foregoing objects and many of the attendant advantages of this invention will become more readily appreciated as the same becomes better understood from the following more detailed description when taken in conjunction with the accompanying drawing, wherein:

FIGS. 3A and 3B are cross-sectional diagrams of closed grooves having aspect ratios other than that specified by the invention;

FIGS. 4A and 4B are transverse diagrams of closed grooves having aspect ratios of the nature specified by the invention; and FIG. 5 is an enlarged diagram of a closed groove formed in accordance with the invention and the velocity profile of the supersonic boundary layer over the groove.

DESCRIPTION OF THE PREFERRED EMBODIMENTS

In general, as will be better understood from the following description, the present invention comprises a plurality of parallel, rectangular grooves formed in the wall of a supersonic flow channel. The grooves are defined by rectangular bars and are oriented such that the longitudinal axes of the bars and grooves lie orthogonal to the flow axis. The length (in the direction of flow) and depth dimensions of the grooves (length/depth is the groove aspect ratio) is such that the particular wall configuration presented by them to a particular supersonic flow results in minimum flow disturbance. The dimensions are such that a low-disturbance dynamic balance between boundary layer diffusion and groove flow is achieved. For minimum disturbance dimensions must be chosen such that a strong flow circulation (stationary open vortex) is formed in the grooves. In this regard, the groove dimensions are relatively large when considered in comparison with the scale of normal wall roughness. Tolerable wall roughness is normally of the order of 0.0002 inch. The grooves may be 0.050 inch or larger in length (in the direction of flow) depending upon the allowable disturbance level. As will be better understood from the following description, the depth of such grooves is, preferably, an integral multiple of the groove length dimension, if minimum disturbance is desired. When the grooves are so constructed with lengths up to the order of 0.005 inch, the flow disturbance ($\Delta\rho/\rho$, where $\rho$ equals the undisturbed local density of the fluid medium) is less than 0.5% near the wall and decreases to less than 0.1% out into the flow for a local turbulent boundary layer thickness of 0.06 inch. The disturbance level increases very slowly with increasing groove length. Variation from this integral multiple relationship is provided by the invention when a greater amount of flow disturbance is desired. The boundary layer thickness is not important except that it should locally be at least slightly larger than the groove length.

Figure 1:
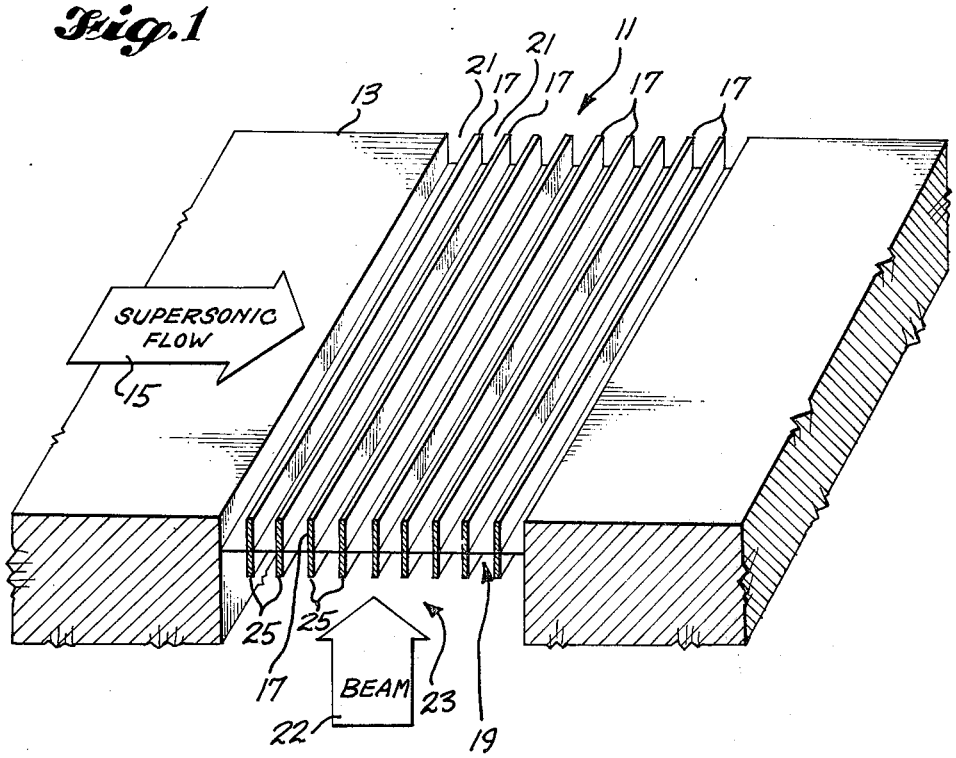
FIG. 1 is a partial perspective view illustrating a supersonic electrical discharge laser electrode formed in accordance with the invention.
Figure 2:
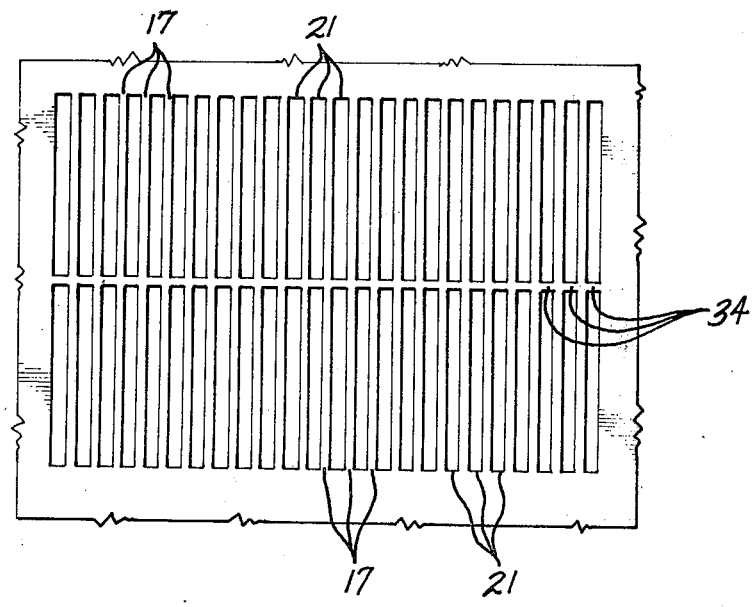
FIG. 2 is a plan view of a low-disturbance transparent electrode formed in accordance with the invention.

FIG. 1 is an isometric diagram illustrating a portion of an electrode 11 formed in accordance with the invention and FIG. 2 is a plan view of an entire electrode. The electrode 11 forms a portion of one wall 13 of the flow channel of a supersonic electrical discharge laser. The remaining walls and the other mechanisms of the laser are not illustrated for reasons of clarity and because they form no part of the invention. An arrow 15 illustrates the direction of flow through the channel.

The electrode, illustrated in FIG. 1, comprises a plurality of spaced rectangular bars 17 arrayed parallel to one another so as to define a grid. The bars 17 also lie orthogonal to the direction of flow defined by the arrow 15. The bars 17 are backed by a thin foil 19. Specifically, the thin foil 19 forms the rectangular base of the grooves 21 defined by the spaced bars 17. The thin foil may be formed of metal or mylar or any other material that is transparent to a beam 22 to be directed through the foil. More specifically, as will be understood by those skilled in the art, the electrode 11 is required to include a window adapted to pass a suitable electron, X-ray or ultra-violet ray beam along an axis generally orthogonal to the flow direction. The thin foil 19 forms the necessary window or output foil and may be formed of metal, mylar or any other suitable material, depending upon the nature of the beam 22.

In some environments, the thin film may not require support in addition to the bars 17 in their desired grid configuration, which grid bars are held in place by end or side wall structure. However, in most environments additional thin film support will be necessary because the channel flow pressure will be substantially greater than the pressure on the remote side of the thin foil 19. FIG. 1 illustrates a suitable additional support comprising backing grid 23 that is an exact replica of the electrode grid. That is, the backing grid 23 is formed of a series of backing bars 25 lying on the side of the thin foil 19 remote from the bars 17 forming the electrode 11. This arrangement is such that each backing grid bar 25 lies parallel to an electrode bar 17 and the thin foil is sandwiched therebetween. In this manner, the backing grid bars do not create any additional ionizing beam blockage, yet they provide additional foil support.

While the backing grid 23 will prevent overall distortion of the foil and the electrode bars, in some instances localized dimpling of the foil may still occur. However, it has been found that such dimpling does not effect the operation of the invention. Also, it is not necessary that the foil be tight against the underside of the bars. Normally the bar thickness (length in the direction of flow) is at least ⅓ the groove length, whereby a relatively large ionizing beam "window" is created. Since the flow creates a drag on the bars, in normal operation a set of streamwise rib stiffeners 24 is used to maintain the essentially undistorted rectangular groove array (see FIG. 2). The bar, stiffener and side support structure are usually formed from a flat plate by electrical discharge machining. This process retains very sharp bar edges which are desired so that the foot of the boundary layer is cleanly sheared off, rather than deflected.

Since the orientation and location of electrodes adapted to create electrical discharges through supersonic gas flows in lasers is well known to those skilled in the art, it will not be discussed herein. In this regard, however, attention is directed to U.S. Pat. No. 3,543,179 issued to J. Wilson for "Nitrogen Laser Action with Supersonic Flow" for its description of the layout of a laser in which the inventive electrode would be useful. However, the present invention should not be construed as being restricted to the Mach number, density, gas conditions or laser cavity cited in that patent.

The foregoing paragraphs have described a useful structure incorporating the basic concept of the invention. The following paragraphs will describe in more detail the mathematic relationship between the length and depth of the grooves and the theory of operation of the invention, as best understood.

It will be appreciated by those skilled in the supersonic flow art that the interaction between the gas in the grooves and the supersonic gas flow is extremely complex. Thus, it is difficult to quantitatively provide a precise theoretical description of this interaction. However, as best understood, the least flow disturbance occurs when a strong flow circulation is established in each groove. A strong flow circulation is established when a generally stationary open vortex exists in the grooves. It has been found that a stationary open vortex exists when the depth of the groove is an integral multiple of the length of the groove in the direction of flow. Thus, in most instances, the groove dimensions are chosen so that this parameter is met.

FIGS. 3A and 3B illustrate the nature of the flow disturbance that occurs when the groove dimensions do not fall within the basic parameter noted above; and, FIGS. 4A and 4B illustrate the minimal flow disturbance that occurs when the groove dimensions fall within this parameter. In FIG. 3A, the length (L) of a groove is illustrated as substantially less than the depth (D) of the groove (also, D is not an integral multiple of L). The groove flow deflection illustrated in FIG. 3A produces a compression wave followed by an expansion wave across the flow channel in the direction of flow (along supersonic characteristic lines). Because of the particular geometry, i.e., the depth and length dimensions, a strong flow circulation is not established in the groove. Rather, the flow deflected into the groove creates a large pressure recovery because the flow is not able to cleanly circulate. The large pressure recovery exceeds the channel flow static pressure and pushes the channel flow out from the groove, distorting the boundary layer by making it effectively thicker, and creating waves. Several grooves of this nature will combine their pressure influences through the subsonic, sub-boundary layer resulting in a strong leading wave being created and propagated across the flow channel.

FIG. 3B illustrates a groove wherein L is substantially larger than D. This groove flow deflection creates an expansion wave followed by compression and expansion waves extending across the flow channel. Separate partial flow circulations are created in the groove resulting in strong shear layer pumping occurring at the upstream region of the groove. The strong shear layer pumping leads to external flow attachment at the base of the groove in an extreme case where L is much, much greater than D. Several grooves of this nature result in a continuous series of distributed strong waves being generated across the flow channel.

It will be appreciated from the foregoing discussion of FIGS. 3A and 3B that, unless the dimensional relationships of the groove length and depth are appropriately chosen as herein described, grooves located orthogonal to a supersonic flow will unduly deflect the flow boundary layer and, in turn, unduly disturb the flow through associated waves.

FIGS. 4A and 4B illustrate grooves formed in accordance with the invention that will not unduly disturb a supersonic flow boundary layer. In both cases, the ratio of D to L is either exactly an integer, (i.e., D/L = 1, 2, . . .), or very close to an integer. When L and D are chosen in this manner a weak expansion wave followed by a weak compression wave is created by the minimal flow deflection by the groove. These waves tend to cancel as they extend into the flow channel as illustrated in FIGS. 4A and 4B. Cancellation takes place because the characteristic angle of the slower (compressed) flow relative to the channel axis is greater than that for the accelerated (expanded) flow and the waves, which are of very nearly equal strength, intersect. The foot of the boundary layer tends to move along the vortex with just enough deflection at the downstream corner to maintain circulation. Several grooves of this nature only form weak localized waves. FIG. 4A illustrates a groove wherein $D \cong L$ and one vortex occurs and FIG. 4B illustrates a groove wherein $D \cong 2L$ and two vortices (counter-rotating) occur.

It will be appreciated from the foregoing discussion and viewing FIGS. 4A and 4B that grooves formed in accordance with the invention do not unduly disturb the flow boundary layer. In fact, it has been found that for such grooves, the relative local change in density through the accompanying waves is less than about 0.5% at the wall, decreasing to less than 0.1% in the channel for groove lengths of the order of 0.050 inch. Experiments to 0.070 inch lengths show almost as weak a wave pair. Thus, a relatively smooth flow passes over the grooves.

FIG. 5 is an illustration of the boundary layer velocity profile 41 of the supersonic flow across a groove 42 formed in accordance with the invention. The groove is illustrated generally square in cross-section i.e., $L = D$ and the boundary layer velocity profile 41 is illustrated at various points defined by the vertical arrows 43.

The actual dimensions of the groove are almost independent of the local boundary layer thickness and other properties, such as temperature (sound speed) that exist in the flow. As will be understood by those skilled in the art, for turbulent boundary layers, the velocity increases by many orders of magnitude within an extremely short distance of the wall. On the other hand, the temperature normally changes by less than an order of magnitude across the whole boundary layer. Thus, the Mach number profile is dominated by the velocity profile and is almost independent of the wall and flow temperatures. Boundary layer thickness is not an important parameter since only the part of the bounary layer nearest the wall is actually involved in the disturbance. For any groove length (L) the dividing streamline 46 separates from the upstream corner 45 of the slot, is deflected into the slot and ends at a stagnation point 47 on the downstream wall. The dividing streamline is the line between the supersonic flow and upper part of the boundary layer and the flow circulation in the groove. Flow below the dividing streamline is separated from the rest of the flow and introduced into the groove. This flow drives the low velocity circulation in the groove and increases the pressure of the gas in the groove through partial deceleration (recovery of total pressure).

If the boundary layer is effectively sheared off above the Mach 1 streamline at the wall plane, the pressure is confined to the individual groove. In this regard, it is pointed out that the Mach 1 streamline of short grooves occurs above the dividing streamline whereby a subsonic layer through which pressure increases can be fed upstream joining all grooves is formed. Thus, an accumulative large flow deflection occurs when the grooves are too narrow. In this regard also, the grooves will always be joined by a subsonic layer if the Mach number of the free stream flow is low. But, if the boundary layer and the free stream are balanced closely enough, only small local deflections will take place and the resulting weak disturbances will be distributed.

It will be appreciated from the foregoing discussion that the grooves of the invention can be chosen to be relatively long and still avoid certain undesirable effects from occurring. In general, there are two scale parameters affecting the disturbance level in the flow. The groove length and the groove length to depth ratio. The smaller the length, the weaker the vortex and the smaller the amount of boundary layer involved. But, because the depth can also be selected so that vortex circulation is easily established, there is little change in the net disturbance magnitude over a relatively wide range of groove size. That is, the proximity of the downstream wall, as determined by the groove length, and the consequent flow circulation in the groove dominate the resultant disturbance. The diffusion of a portion of the boundary layer into the groove near the downstream wall is just sufficient to cause flow circulation in the groove. This flow circulation is just adequate to maintain the dividing streamline located at the surface of the grooves (except for the regions near the downstream wall). This condition of dynamic equilibrium is stable. That is, an increase in flow deflection into the groove near the downstream wall causes increased circulation. Increased circulation, in turn, raises the pressure in the groove which tends to reduce the flow deflection into the groove. Hence, a balance state is achieved. Because of the steepness of the turbulent boundary layer velocity profile near the wall, very small dividing streamline deflection is required for balancing. It will be appreciated by those skilled in the art that this condition of stability is extremely important for rapid recovery from an electrical discharge pulse energy addition to the flow, as occurs in a laser of the type described above.

The groove depth (D) is selected on the basis of the desired groove aspect ratio and the strength of the associated disturbance that can be tolerated. As an example, the groove depth may be determined by its effect on electron beam collimation. In general, the groove must be "deep" as far as the flow is concerned ($D/L \geq 1$) in order for the flow above the dividing streamline to pass smoothly over the shoulder of the downstream wall. In this regard it should be noted that the choice of the groove aspect ratio effects the amount of flow circulation in the groove. In general, circulation velocity is impaired for non-integral values of D/L. The reduction in circulation velocity ultimately results in the failure of balanced open vortex formation whereby the conditions illustrated in FIGS. 3A and 3B and discussed above occur.

It will be appreciated by those skilled in the art that considerable mass exchange will take place between the boundary layer and the circulating flow in the grooves, especially for turbulent boundary layers. This fact is important to the electrical discharge electrode of the invention in the pulsed discharge mode, as it contributes to flow recovery and heat transfer following the electrical discharge pulse.

In conclusion, it will be appreciated that the invention basically comprises a low-disturbance, transparent electrode for use in a supersonic flow channel. The invention can be used to form an electrode in a supersonic electrical discharge laser. Alternatively, it can be utilized for uniform supersonic flow energy addition. In the case of the laser, the reciprocal of the groove aspect ratio (D/L) is, preferably, an integer whereby minimum disturbance to the flow occurs.

While preferred embodiments of the invention have been illustrated and described, it will be appreciated that changes can be made therein without departing from the spirit or scope of the invention as may be required for other closed ribbed wall applications. Hence, the invention can be practiced otherwise than as specifically described herein.

The embodiments of the invention in which an exclusive property or privilege is claimed are defined as follows:

1. In a supersonic flow channel wherein a gas moves through the channel at supersonic speeds, an improved low disturbance wall including at least one groove lying substantially orthogonal to the direction of flow, said groove open to said channel and formed such that at least one substantially stationary vortex is formed in the groove.

2. An improved supersonic flow channel wall as claimed in claim 1 wherein said wall includes a plurality of grooves defined by a plurality of bars lying substantially parallel to one another and substantially orthogonal to the direction of flow, said grooves open to said channel and formed such that at least one substantially stationary vortex is formed in each of said grooves.

3. An improved supersonic flow channel wall as claimed in claim 2 wherein said grooves are substantially rectangular in cross section and wherein the reciprocal of the aspect ratio of said grooves is near an integral value.

4. An improved supersonic flow channel wall as claimed in claim 3 wherein said reciprocal of the aspect ratio is an integral value.

5. An electrode suitable for use in a supersonic electrical discharge laser wherein a gas flows through a channel at supersonic speeds, said electrode comprising:

a plurality of spaced bars lying parallel to one another and orthogonal to the direction of flow, said bars forming a portion of one wall of said channel; and, a thin foil, said thin foil being located on or near the underside of said bars so that said bars define the sidewalls of a plurality of grooves open to said flow channel and lying substantially orthogonal to the direction of flow and said foil defines the base of said grooves, said grooves having an aspect ratio such that substantially stationary vortices are formed in the grooves.

6. An electrode for a supersonic electrical discharge laser as claimed in claim 5 wherein said foil is adapted to form a window for an ionizing beam.

7. An electrode for a supersonic electrical discharge laser as claimed in claim 6 wherein said grooves are generally rectangular in cross section 8. An electrode for a supersonic electrical discharge laser as claimed in claim 7 wherein the reciprocal of the aspect ratio of said grooves is near an integral value.

9. An electrode for a supersonic electrical discharge laser as claimed in claim 8 wherein said reciprocal of the aspect ratio is an integral value.

10. An electrode for a supersonic electrical discharge laser as claimed in claim 9 including a support, said support comprising a plurality of bars forming a replica of said bars forming said electrode, said replica bars mounted on the side of said foil remote from said electrode bars so as to sandwich said foil between said replica bars and said electrode bars.

11. An electrode for a supersonic electrical discharge laser as claimed in claim 5 including a support, said support comprising a plurality of bars forming a replica of said bars forming said electrode, said replica bars mounted on the side of said foil remote from said electrode bars so as to sandwich said foil between said replica bars and said electrode bars.

* * * * *